United States Patent [19]

Butz et al.

[11] 4,253,129
[45] Feb. 24, 1981

[54] DISC PACK HANDLE MECHANISM

[75] Inventors: David E. Butz, Littleton; Alan L. Stenfors, Scituate; Robert W. Jones, Waltham, all of Mass.

[73] Assignee: Data Packaging Corporation, Cambridge, Mass.

[21] Appl. No.: 62,139

[22] Filed: Jul. 30, 1979

[51] Int. Cl.³ .................. G11B 17/26; G11B 23/02; B65D 85/30
[52] U.S. Cl. .................. 360/133; 206/444; 360/97
[58] Field of Search .................. 360/133, 132, 97–99, 360/86; 206/444

[56] References Cited

U.S. PATENT DOCUMENTS

| | | | |
|---|---|---|---|
| 3,635,608 | 1/1972 | Crouch et al. | 360/133 |
| 3,715,739 | 2/1973 | Van Acker | 360/133 |
| 3,882,701 | 5/1975 | Wirth | 206/444 |
| 4,071,862 | 1/1978 | Lathrop, Jr. et al. | 360/97 |
| 4,090,609 | 5/1978 | Rager | 206/444 |

Primary Examiner—Alfred H. Eddleman
Attorney, Agent, or Firm—Wolf, Greenfield & Sacks

[57] ABSTRACT

This invention relates in general to a disc pack cartridge and more particularly pertains to a handle for a single disc cartridge having an improved mechanism that enables unlatching of the removable bottom cover of the cartridge. The handle can be raised from a horizontal to a vertical position on the top cover either to carry the latched cartridge about conveniently or to unlatch the bottom cover. A special guide is incorporated into the handle to control the path of movement of the handle when it is moved between its horizontal and vertical positions.

6 Claims, 18 Drawing Figures

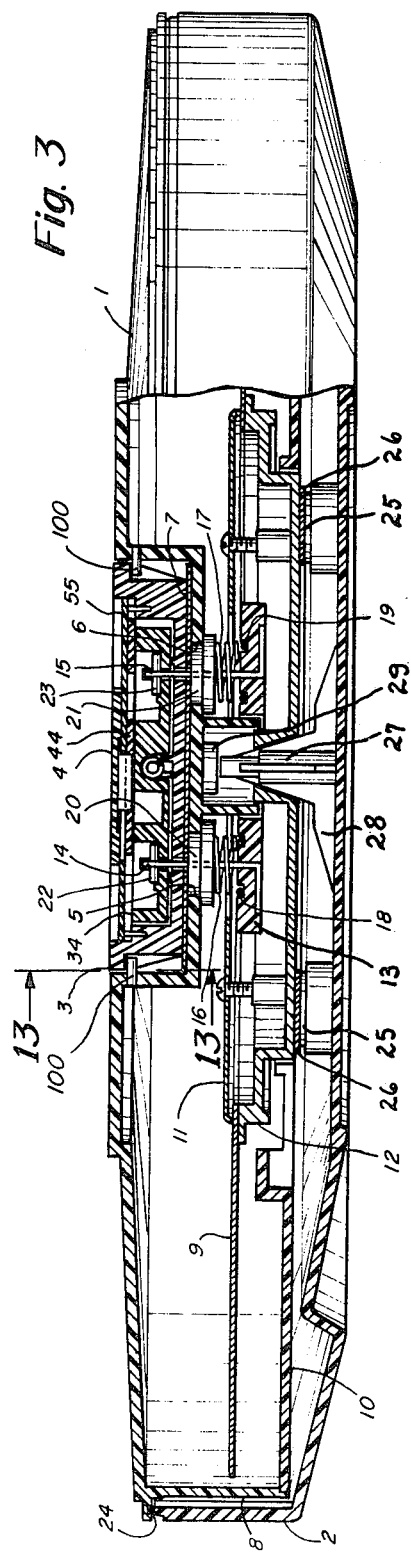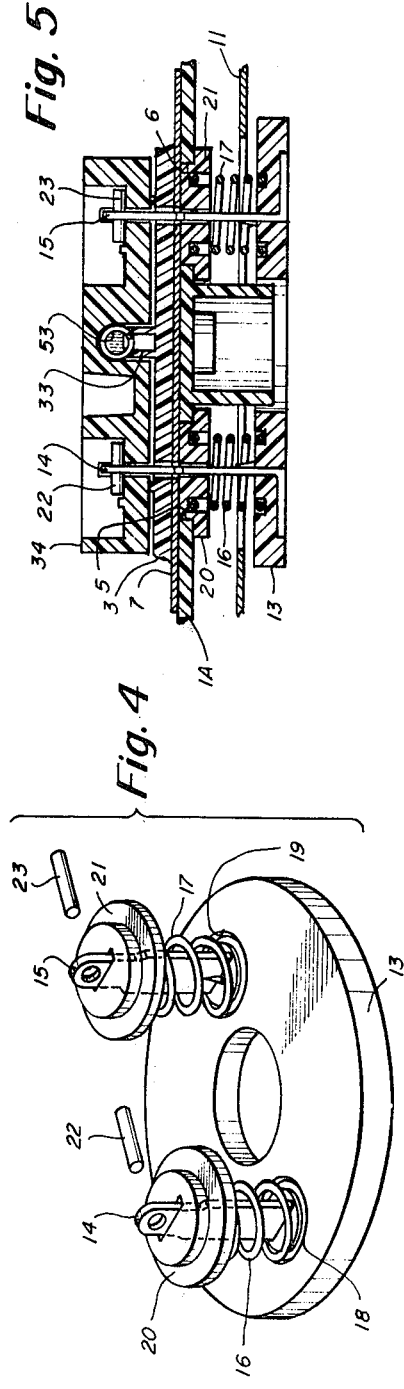

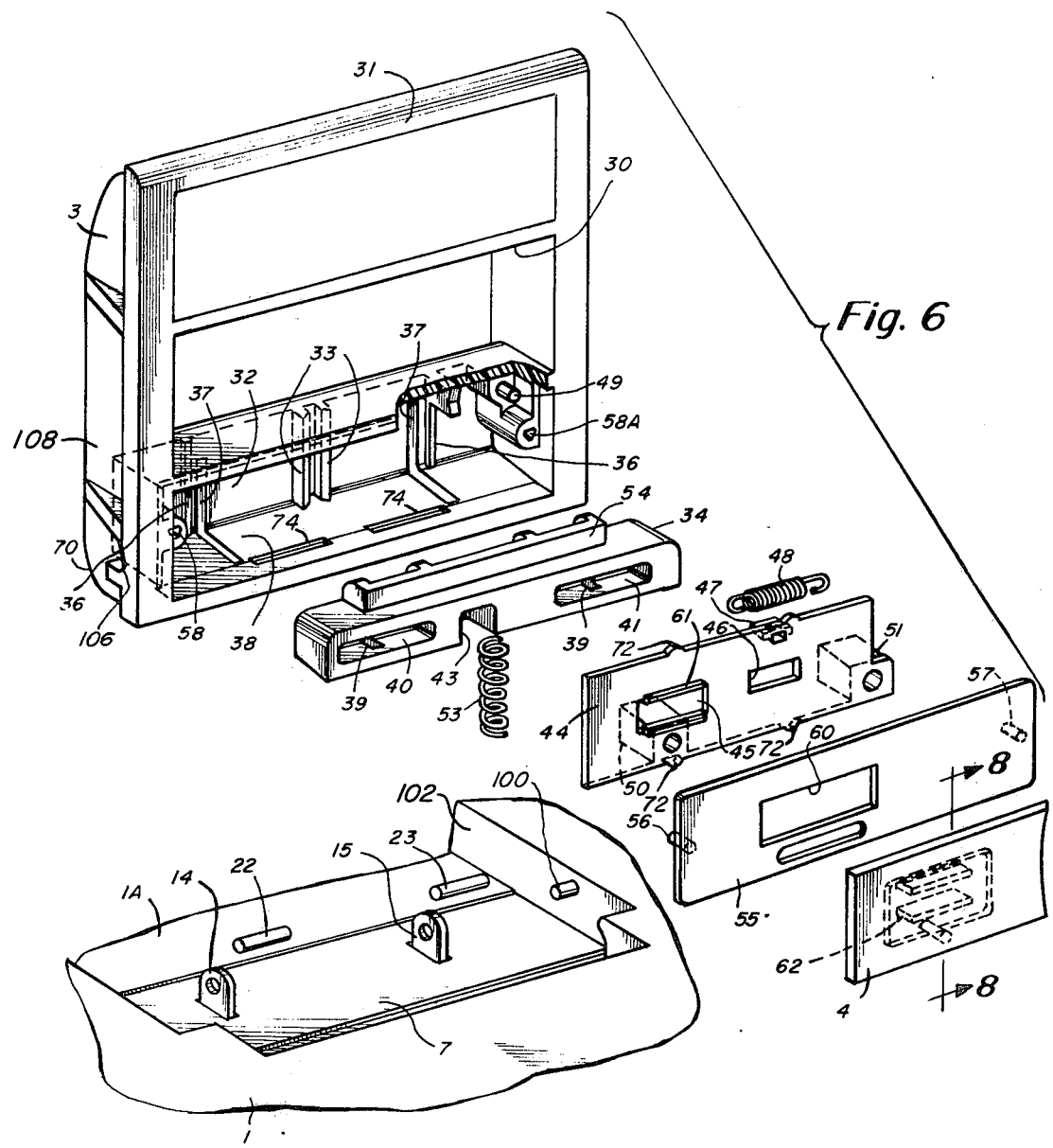
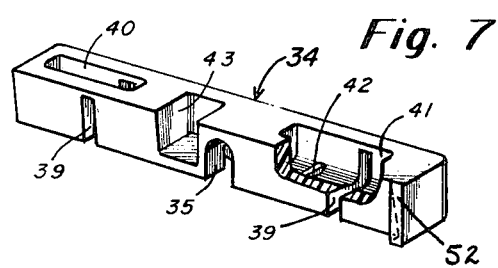

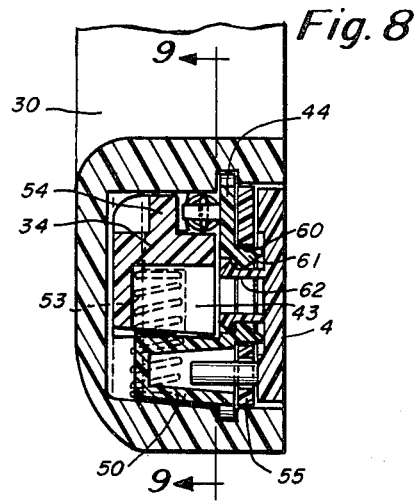
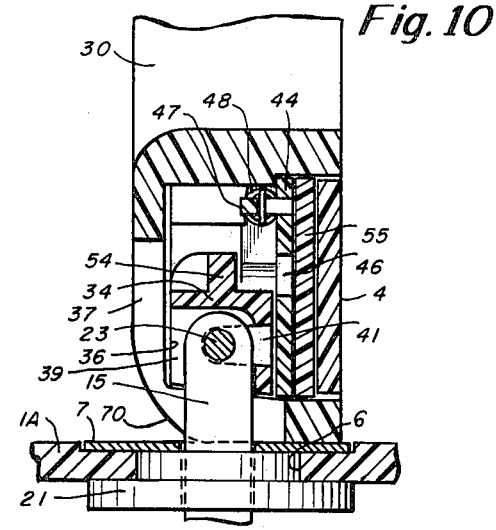
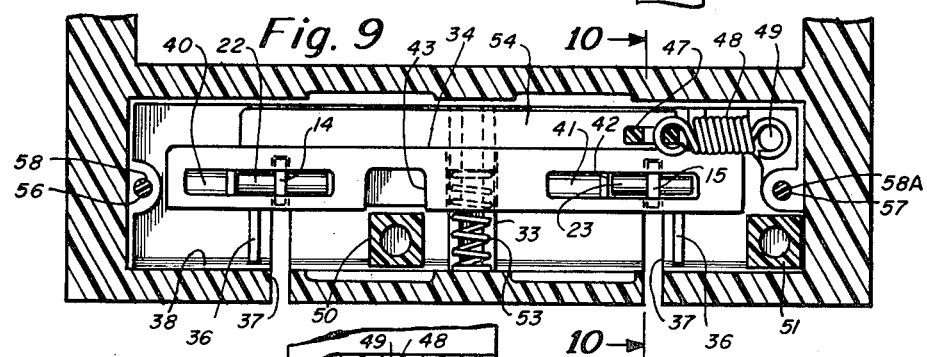
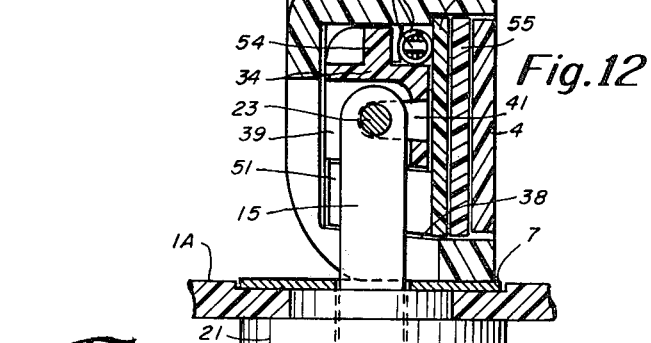
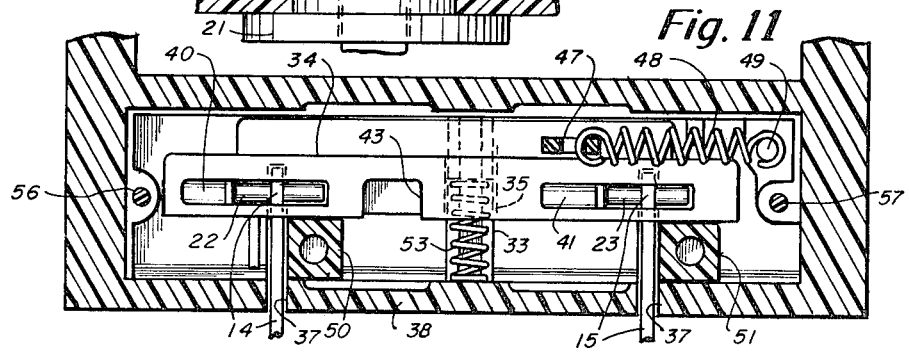

DISC PACK HANDLE MECHANISM

BACKGROUND OF THE INVENTION

This invention is an improvement over the invention shown in copending application Ser. No. 969,073 filed Dec. 13, 1978, now abandoned, entitled Disk Pack Handle Mechanism and assigned to assignee of the present application.

Magnetic discs are widely used in electronic data processing systems for the storage and retrieval of information. To protect the magnetic discs, the discs are enclosed in housings having latchable bottom covers. The discs and their housings are known as disc packs. When it is desired to use a disc, the bottom cover is removed from the housing to enable read/write heads to be brought into close proximity to the information surfaces of the disc while the disc is rotated. In one type of disc pack having but a single disc in it, a handle on the housing top cover is provided to facilitate carrying of the disc pack. The handle contains a mechanism that enables the bottom cover to be unlatched by moving a steel armature away from magnets embedded in the bottom cover.

In copending application Ser. No. 969,073 Supra, an improved actuating mechanism is disclosed wherein the hub that carries the magnetic disc also carries the armature, and the hub is raised on the top cover by an assembly that includes a lift plate that has arms connected to a carriage in the handle. When the handle is raised the carriage may or may not exert a pull on the arms to raise the lift plate so as to open the magnetic latch that connects the top and bottom covers, depending upon the position of a finger actuated control slide.

OBJECT OF THE INVENTION

The principle object of this invention is to provide a guide for control of the handle so that when the handle is raised and lowered no extraneous motion will occur that may place undesired stresses on the handle mechanism and/or accidently release the magnetic latching device.

THE INVENTION

The invention resides in a special guide incorporated in the handle and top cover to ensure that as the handle moves it follows the proper path both when it is raised either for carrying or opening the disc pack and when returned to the horizontal or stored position in the top cover. In accordance with the preferred embodiment of this invention a generally V-shaped cam surface is provided in each side of the handle, and pins extend to the surfaces from the well in the top cover in which the handle is mounted. As the handle is raised, the pins provide a fixed axis about which the handle rotates during the initial lifting motion, and a rounded corner of the handle slides on the bottom wall of the top cover well.

The corner of the handle is specially shaped to enable it to slide readily on the bottom wall of the well so that it forms a moving fulcrum for the lifting action applied by the handle to the arms carrying the lift plate when the handle is raised to open the magnetic latch.

When the handle is raised to carry the pack (and not to open the pack), the pins and cam surfaces assure that the handle does not pivot about some extraneous axis which could cause the arms to be lifted so as to open the latch unintentionally.

BRIEF FIGURE DESCRIPTION

FIG. 3 is a side view of a single disc cartridge with parts broken away to show the internal arrangement in the assembled unit.

FIG. 4 shows the lift plate subassembly employed in the invention.

FIG. 5 shows the position of the lift plate subassembly in relation to the top cover of the cartridge.

FIG. 6 is an exploded view of the preferred embodiment of the invention.

FIG. 7 is a perspective view of the yoke employed in the preferred embodiment of the invention.

FIG. 8 shows the arrangement locking the slide button and slide together to enable them to slide as a unit along the cover plate.

FIG. 9 is a fragmentary cross sectional view of the handle mechanism with the handle shown in the horizontal position.

FIG. 10 is a fragmentary cross sectional view of the handle shown in the raised position in the carrying mode.

FIGS. 11 and 12 are views similar to FIGS. 9 and 10 but showing the unlatching mode of the handle.

DETAILED DESCRIPTION

Figure 1:
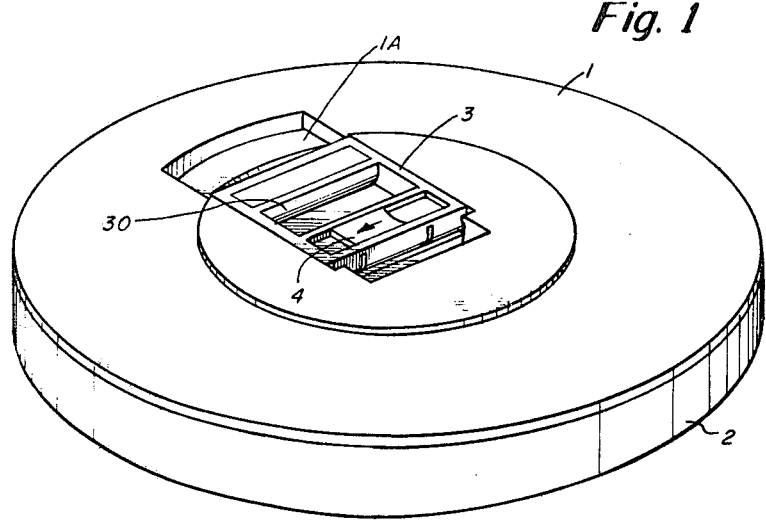
FIG. 1 is a perspective view of a single disc cartridge.

The general configuration of a single disk cartridge is depicted in the perspective view of FIG. 1. The cartridge has a circular top cover 1 to which a removable bottom cover 2 is secured by a magnetic latch. Disposed in a well 1A in the top cover is a handle 3 which can be raised to a vertical position. In the horizontal position of the handle depicted in FIG. 1, the handle is flush with the upper surface of the top cover. To unlatch the removable bottom cover, a finger actuated button 4 is slid in the direction of the arrow and the handle is then raised to the vertical position. Upon return of the handle to the horizontal position, the button is automatically restored to its initial station. To facilitate carrying of the cartridge with the removable bottom cover attached, the handle is raised to the vertical position without actuation of button 4.

Figure 2:
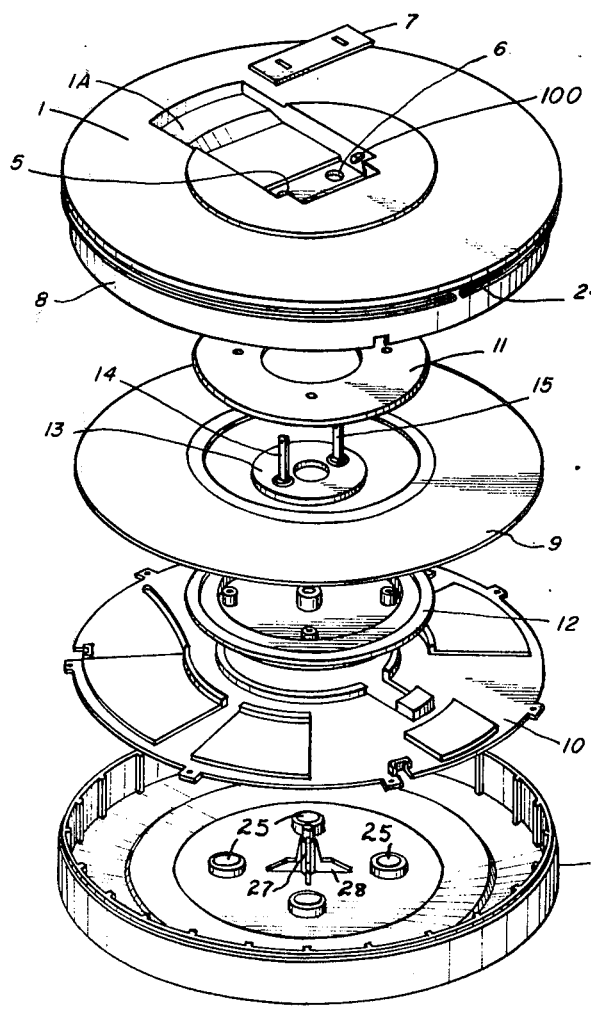
FIG. 2 is an exploded view showing the arrangement within the cartridge.

In the exploded view of the single disk cartridge depicted in FIG. 2, top cover 1 has a pair of circular holes 5 and 6 in the well 1A which are covered by a protective plate 7. The top cover has a depending skirt 8 in which there are openings to permit reading and writing heads to be brought into close proximity to the information tracks on the magnetic disk 9. That disk, as best shown in FIG. 3 is disposed within the housing formed by the top cover 1 and a protective cover 10 secured to the lower edge of skirt 8. The disk 9 can be of the conventional construction which utilizes an annular flat rigid plate of a non-magnetic material such as aluminum that is coated on one or both sides with a magnetizable recording medium. The disk is clamped between an annular clamp plate 11 and a disk hub 12. The annular clamp plate 11 has a downturned rim and that plate is bolted to the disk hub 12 as indicated in FIG. 3 to cause the downturned rim to engage the inner rim of the annular magnetic disk and clamp the disk against the hub. The annular clamp plate is sufficiently wide so that its inner portion overhangs a depression in the disk hub. Disposed within the depression and captured in it by the overhang of the clamp plate is a lift plate 13.

As depicted in FIG. 4, the lift plate subassembly includes the lift plate 13 which is an annular member having connecting means in the form of a pair of lift arms 14 and 15 protruding through slots in the plate. The lower ends of the lift arms are bent to provide tabs which engage the underside of the plate and lift the plate when arms 14 and 15 are raised. Surrounding the lift arms 14 and 15 are helical compression spring 16 and 17. To keep the helical springs in position around the lift arms, circular grooves 18 and 19 are provided in the upper side of the lift plate to receive the lower ends of the compression springs. The upper ends of the compression springs are similarly seated in grooves in bezels 20 and 21 disposed at the upper ends of lift arms. The bezels are circular plugs which fit into holes 5 and 6 in top cover 1 as depicted in FIG. 5. To prevent the bezels from being pushed through the holes by the compression springs, the bezels are provided with shoulders that seat against the underside of the top cover. The bezels are provided with slots that enable the lift arms to pass through the bezels and to move up and down relative to the bezels. When the bezels are positioned in openings 5 and 6 in the cover, the bezels align the lift arms 14 and 15 to ensure vertical motion of the lift plate assembly. The holes in the top cover are covered by a protective plate 7 having apertures permitting the lift arms to protrude through the protective plate. The upper ends of the lift arms, as shown in FIG. 4, have bores for receiving pins 22 and 23 that serve as pivotal connections between the lift plate subassembly and handle mechanism to be described presently.

Referring again to the exploded view of FIG. 2 and to the assembled view of FIG. 3, the removable bottom cover 2 has a cylindrical upturned rim dimensioned to fit around the skirt 8 of the top cover. When assembled to the top cover, the edge of the upturned rim of the removable bottom cover seats against a seal 24 to provide a dustproof enclosure for the magnetic disk. As best shown in FIG. 3, the top cover has a peripheral flange providing a groove in which the seal is retained. To keep the removable bottom cover 2 latched to the top cover, the removable bottom cover is provided with magnets 25 that are attracted to an annular armature plate 26 secured to the underside of the disk hub 12. The disk hub is constructed of a non-magnetic material whereas the armature plate is made of a magnetizable material such as steel.

To enable the bottom cover 2 to be detached, the magnetic attraction between the magnets 25 and the armature plate is broken by moving the disk hub upwardly away from the magnets. The magnets 25 are secured to the bottom of the removable cover 2 and are disposed symmetrically about a central post 27 which is braced laterally by buttresses 28. The top of the central post 27 engages a stub 29 which extends downwardly from the underside of the top cover. Upon raising of the armature plate, the removable bottom cover is prevented from following the upward movement of that plate by the stub 29 which is disposed directly above the central post.

The mechanism for raising and lowering the lift plate is housed in a chamber in the handle 3. An exploded view of that mechanism is depicted in FIG. 6. The handle has a central opening 30 which enables the fingers to curl under and grasp the crossbar 31 which extends between the side members of the handle. The chamber 32 of the handle has a central pair of rails 33 disposed on the chamber's floor. A carriage or yoke 34 is mounted over the rails. As indicated in FIG. 7, the yoke 34 has a central channel 35 in which the rails are received to permit the yoke to straddle those rails. To facilitate sliding movement of the yoke, a pair of ribs 36 may be provided on the floor of chamber 32 to support the yoke. The yoke may slide on the ribs while the rails restrict the yoke to back and forth transverse motion in the handle chamber 32.

A pair of slots 37 extend completely through the floor of the chamber as well as completely through a portion of the chamber front wall 38. Thus in FIG. 6, those slots are depicted as being L-shaped. The slots are of sufficient width to permit the lift arms 14 and 15 to extend through the slots into the chamber.

Referring again to FIG. 7, the carriage or yoke 34 has slots 39 which align with the slots 37 of the chamber when the yoke is positioned in the chamber to straddle the rails 33. The upper ends of lift arms 14 and 15 in the assembled handle are received in the slots 39, and pins 22 and 23 are slid through the bores in those upper ends to lock the lift arms to the yoke while permitting those arms to pivot. The pins 22 and 23 are received in a pair of channels 40 and 41 extended into the yoke. The channels are of sufficient length to permit the pins to be dropped into the channels and then pushed laterally through the bores in the upper ends of the pivot arms. To prevent the pins from accidental disengagement from the lift arms, a raised stop is provided in each channel, as indicated in FIG. 7 by the stop 42 in the bottom of channel 41. Thus yoke 34 serves as a carriage in the handle mechanism for the depending lift plate subassembly.

Adjacent to the central channel 35 of the yoke is a receiver aperture 43 which is dimensioned to receive a blocking member carried by the slide 44 (FIG. 6). The slide essentially comprises a control member for the operation of the handle mechanism on the lift plate subassembly. In the assembled handle, the slide is disposed above the yoke 34, and to facilitate assembly of the mechanism the slide is provided with apertures 45 and 46 which can be aligned with the channels 40 and 41 of the yoke to enable the pins 22 and 23 to be dropped into those channels and then moved into engagement with the upper ends of the lift arms. Protruding from the slide 44 is an eye 47 which engages one end of a spring 48 whose other end is anchored to a post 49 in the chamber of the handle. Spring 48 pulls slide 44 to the right as viewed in FIG. 6, and when the slide is at its extreme right station a blocking member 50 which depends from the slide is positioned in alignment with the receiver aperture 43 of the yoke, and the yoke can, consequently, move forwardly toward the front wall 38 of the chamber in the handle. When slide 44 is moved to the left, the spring 48 extends, blocking member 50 is moved out of alignment with the receiver aperture 43 of the yoke, and a second blocking member 51 which depends from the slide is also moved to a blocking position in front of the yoke. The yoke consequently is blocked from forward movement when the slide 44 is moved to the left, as viewed in FIG. 6. At the extreme right position of slide 44, blocking member 51 is beyond the right edge of yoke 34. To prevent the slide 44 from inadvertently being returned to the right by spring 48, the yoke 34 carries a safety stop 52 which protrudes slightly from the front face of the yoke at its right corner. Thus, when the slide is moved to the left and the handle is raised slightly from its horizontal position, the yoke will be pulled forwardly just enough to enable the safety stop to block the slide from being returned to its right station by the spring 48.

The slide 44 is held in place on handle 3 by the nibs 72 on the side edges of the slide, which fit into the grooves 74 on both sides of handle chamber 32. This allows the handle 3, yoke 34, springs 53 and 48 and slide 44 to be preassembled and permits the handle assembly and lift plate assembly to be shipped separately to the customer who may then conveniently connect the two during the assembling of the disk packs with a minimum of loose parts.

Yoke 34 is biased to its rearward position by a spring 53 which acts to press the yoke against the rear wall of chamber 32. Spring 53 is positioned in the channel 35 of the yoke and between rails 33 so that the spring is compressed by the yoke when the yoke moves forwardly toward the front wall 38. The channel 35 of the yoke has a back wall against which one end of spring 53 seats, and the other end of that spring seats against the front wall 38 of the chamber. At its rear, the yoke has a ledge 54 which is lower than the top surface of the yoke so as to enable spring 48 to extend above the ledge when slide 44 is moved to the left.

Slide 44 and slide button 4 form a unit that slides along cover plate 55. The cover plate, in the assembled handle, is fixed in position and for that purpose carries pins 56 and 57 which are inserted in receptacles 58 and 58A in the housing. The receptacles 58 and 58A are shown in FIG. 6 inside the chamber 32. The cover plate 55 has a longitudinal aperture 60 which enables the slide button 4 to engage the slide 44.

Extending upwardly along the longitudinal edges of opening 45 of slide 44 are a pair of flanges 61 which are best shown in FIG. 8. The flanges extend through the opening 60 of cover plate 55 and have sloping faces which are undercut at their lower ends. Slide button 4 has a pair of downwardly depending snap legs 62 which have sufficient resiliency to fit between the sloping faces of the flanges and provide a snap fit with the slide. To keep the button and slide locked together, the snap legs have barbs which extend into the undercuts of the flanges. To enable the button to be pried off, the barbs of the legs have slanted facets. In assembling the sliding unit about the cover plate, the cover plate is placed over the slide 44 with the flanges extending through the aperture 60 of the cover plate. Button 4 is then pressed down to cause the snap legs 62 to snap into engagement with the flanges. The slide button and slide can then be moved as a unit along the cover plate. The slide button is sufficiently long to cover the aperture 60 in the cover plate even at the extreme limits of movement of the sliding unit.

In FIGS. 9 and 10, the slide is at the station where blocking member 50 is aligned with the aperture 43 of yoke 34, and blocking member 51 is out of the path of forward movement of the yoke. Upon lifting of the handle to the raised position of FIG. 10, the yoke slides forwardly within the chamber 32 against the bias of spring 53 without raising the arms 14 and 15 enough to lift the armature plate away from the magnets or the removable lower cover. Consequently, the removable bottom cover remains magnetically latched.

In the unlatch mode depicted in FIGS. 11 and 12, the slide has been moved to position blocking member 50 and 51 in front of yoke 34. Upon lifting of the handle, the yoke is prevented from sliding within the chamber by the blocking members, and consequently, as the handle is raised, the lift arms 14 and 15 are pulled upwardly and raise the armature plate away from the magnets on the removable lower cover and thereby unlatch the removable bottom cover.

The mechanism described in detail above, which is essentially that shown in application Ser. No. 969,073 Supra, depends upon the proper sliding movement of yoke 34 in the handle cavity for proper operation. Should the yoke not slide in the intended fashion within the handle when the handle is moved between its horizontal and vertical positions, the magnetic latch could unintentionally open so as to cause the bottom cover to accidentally drop from the rest of the disc pack assembly. For example, if the handle is raised to the vertical position but the yoke 34 for some reason does not slide to the front of the handle cavity even though the slide 44 has not been moved to the blocking position, then the bottom cover would be released and if unsupported would fall from the disc pack and might break. On the other hand, if the handle is in the vertical position and in the carrying mode is returned to the horizontal position and for some reason the yoke does not slide to the rear of the cavity in the handle, it would not thereafter be possible to move the slide so as to unlatch the magnetic latching device when the handle is again elevated.

In order to establish a precise path of travel for the handle when it is moved between the raised and lowered positions and to provide greater rotational rigidity for the entire handle assembly so as to insure proper operation of the latching mechanism, a pair of pins 100 are mounted on the side walls 102 of the well 1A in top cover 1, which pins are axially aligned with one another and register with V-shaped notches 106 that define cam surfaces provided in the sides 108 of handle 3. The pins and notches are shown in FIGS. 6 and 13–18. In FIGS. 13 through 18 the effect of the pins and slots on the course of movement of the handle is illustrated.

Figure 13:
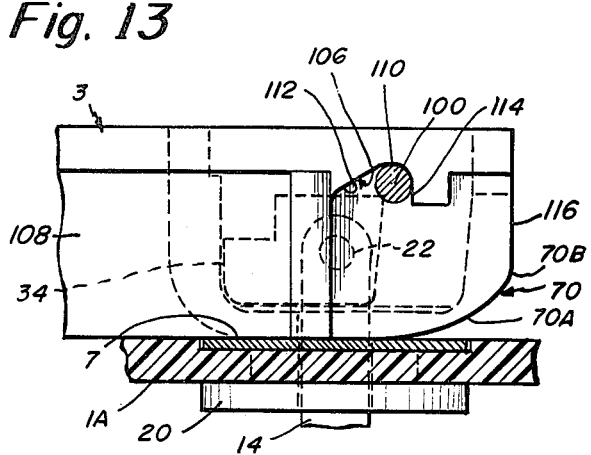
FIGS. 13 to 18 are fragmentary cross sectional views of the handle showing the series of positions assumed by the handle as it moves from the horizontal, stored position to the raised, vertical, carrying position without unlatching the magnetic latch.
Figure 14:
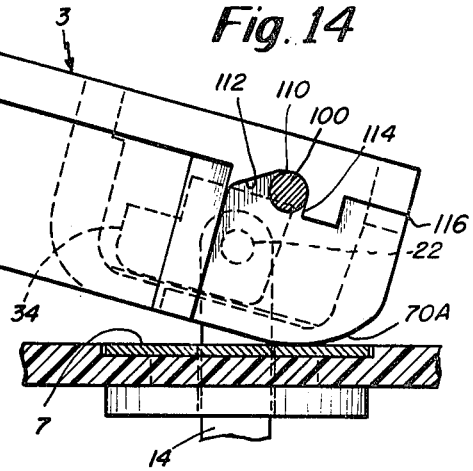
Figure 15:
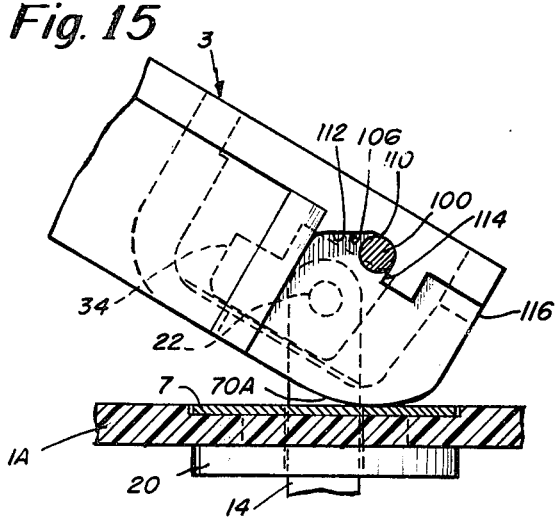

In FIG. 13 lift arm 14 is shown extending upwardly into the handle cavity and is anchored to yoke 34 by pin 22. The pin 100 on the side wall of the top cover well 1A is shown disposed in the crotch 110 of the notch 106. It will be noted in FIG. 13, (as well as in FIGS. 14 through 18) that notch 106 is defined by converging inclined substantially straight wall section 112 and vertical wall section 114, and the rounded crotch section 110 which is substantially tangent to the tops of wall sections 112 and 114. As the handle moves from the horizontal position shown in FIG. 13, through the positions shown in FIGS. 14 and 15 to the position shown in FIG. 16, the handle pivots about the fixed axis of pin 100 as the axis of the pin 100 remains in fixed relationship to the notch 106. At the same time, the lower front corner 70 of handle 3 slides on the protective plate 7 represented merely as a surface in FIGS. 13 to 18. The configuration of the corner 70 is such that as the handle is raised, the corner defines a ramp that slides on the surface 7 and acts as a wedge so as to cause the handle itself to exert a lifting force on the yoke which in turn transfers that force as a pull upon the arm 14 (and 15). Because of the flatness of the corner 70 particularly at its leading end 70A, the handle slides smoothly on surface 7 and does not form an independent pivot point for the handle which would cause the pin 100 to slide on wall section 112 of notch 102.

Figure 16:
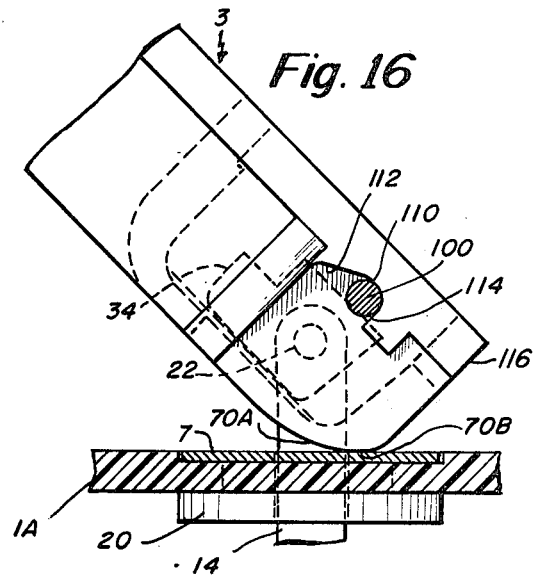
Figure 17:
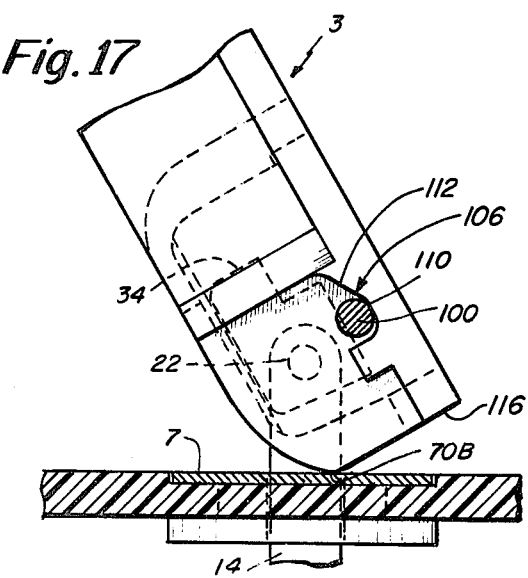
Figure 18:
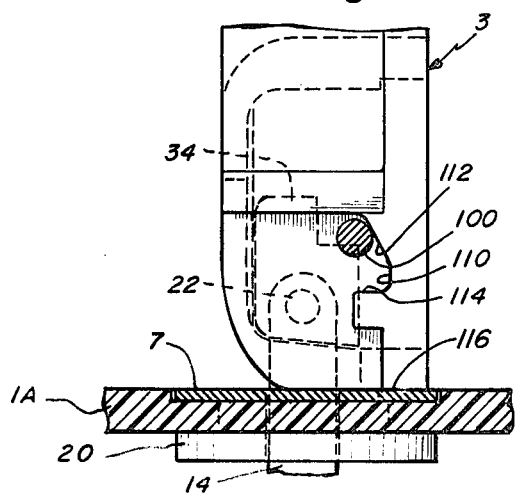

With the handle in the position shown in FIG. 16, the axis of pin 22 supporting arm 14 reaches its maximum elevation above surface 7, and with continued movement of the handle through the position shown in FIG. 17 to the vertical position shown in 18, the axis of pin 22 drops slightly toward surface 7. The movement of the lift arm 14 is not sufficient to cause the lift plate 13 to raise the hub 12 and armature 26 so as to open the magnetic latch. In the actual disc pack tested, a lift of the arms 14 and 15 of 0.160 inch was required to release the latch, and the axis of pin 22 is raised a maximum of only 0.082 inch when the slide 44 is in the inactive position.

Referring again to FIG. 16, it will be noted that as the axis of pin 22 reaches the maximum elevation above surface 7, the trailing portion 70B of corner 70 is in contact with the surface 7, and it slides beneath the axis of pin 22 until the flat front side 116 of handle 3 rests on surface 7. As the handle moves from the position shown in FIG. 16 through that of FIG. 17, to the position of FIG. 18, the pins 100 slide up the inclined wall sections 112 of V-shaped notch 102 so as to allow the front end 116 of the handle to rest on surface 7.

From the foregoing description it will be appreciated that the pin and V-shaped cam notch that join the handle 3 and the top cover provide greater rotational rigidity for the handle to insure that the handle follows a prescribed path so as not to accidentally either unlatch the pack or prevent it from being unlatched after the handle has been once placed in the carrying position. The large radius at the handle corner 70 facilitates the sliding of the handle on the surface while the smaller radius at the trailing edge of the corner blends the large radius section 70A with the flat end wall 116. As a result, more dependable action occurs under the influence of spring 53 which moves the yoke to the rearward position when the handle is returned to the horizontal plane, and the spring 53 is overcome under the pull of the lift arms 14 and 15 on the yoke when the handle is elevated, so long as the slide has not been placed in the active or unlatching position. At the same time, the mechanism retains the many advantages outlined in the copending application Ser. No. 969,073 Supra.

While in the preferred embodiment shown and described the improvement in the handle operation is accomplished by the pin and V-shaped notch arrangement provided in the top cover and handle, it will also be appreciated that other types of connections may be provided for that purpose. Therefore, it is not intended to limit the breadth of the invention to the specific embodiment illustrated and described. Rather, it is intended that the scope of the invention be limited only by the appended claims and their equivalents.

What is claimed is:

1. A disc pack assembly comprising:
    a cover and a base, said cover having a handle on its upper side that can be raised from a horizontal position to a raised position on the cover,
    a lift plate disposed below the handle on the bottom side of the cover for carrying an armature forming part of a magnetic latching assembly for releasably connecting the cover and base,
    a chamber within the handle and connecting means secured to the lift plate and extending into the chamber,
    a carriage confined to and movable in the chamber between first and second positions,
    means in the chamber biasing the carriage to the first position and second means acting on the carriage when the handle is raised to a raised position to move the carriage to the second position,
    said carriage when in the first position and when the handle is raised pulling on the connecting means to substantially raise the lift plate with respect to the cover so that the armature moves with respect to the base to unlatch the cover and base, said carriage when in the second position and when the handle is raised not substantially raising the lift plate so that the base and cover are not unlatched,
    pivot means within the chamber pivotally connecting the connecting means to the carriage,
    control means on the handle movable between an active position wherein the second means is overcome and the carriage remains in the first position when the handle is raised, and an inactive position wherein the second means acts to move the carriage to its second position when the handle is raised,
    and means interconnecting the handle and cover controlling the path of the handle when moved between the horizontal and raised positions for limiting the pull that may be exerted on the connecting means when the handle is raised and the control means is in the inactive position.

2. A disc pack assembly as defined in claim 1 further characterized by
    said means interconnecting the handle and cover including a pin fixed to the cover and a V-shaped notch in the handle into which the pin extends, said pin remaining in the crotch of the V-shaped notch during the initial stages of raising the handle and sliding up one side of the notch as the handle approaches the raised position, said pin sliding toward the crotch during the initial stages of the return of the handle to the horizontal position and remaining at the crotch as the handle reaches the horizontal position.

3. A disc pack assembly as defined in claim 1 further characterized by
    said cam means including a pin and cam surface intermediate to the ends of the handle establishing a pivot about which the handle turns when moving from the horizontal toward the raised position, said pin shifting in the slot to change the pivotal axis of the handle as it completes its move to the raised position,
    and a ramp like corner formed in one end of the handle for sliding along the top of the cover as the handle turns from the horizontal toward the raised position.

4. A disc pack assembly as defined in claim 3 further characterized by
    said cam surface being generally a V-shaped notch with the pin being disposed at the crotch of the slot during initial motion from the horizontal to the raised position and sliding from the crotch along one side of the notch as the handle completes its travel to the raised position, and said pin sliding on one side of the notch toward the crotch during the initial portion of the travel from the raised to the horizontal position and then remaining in the crotch during the remainder of travel to the horizontal position.

5. A disc pack handle assembly comprising:
   a cover having walls defining a recess provided in its upper surface,
   a handle in the recess, said handle having sides, top and front walls,
   pivot means joining the sides of the handle to the recess walls establishing an axis about which the handle may pivot from a horizontal to a raised position on the cover,
   lift arms extending through the cover into the recess and pivotally connected to the handle for controlling a latching mechanism,
   and a ramp formed in the handle front wall for sliding on the bottom of the recess as the handle is moved between the horizontal and raised positions, said ramp causing the handle to move translationally with respect to the axis established by the pivot means as the handle approaches the raised position and immediately upon leaving the raised position.

6. A disc pack assembly as defined in claim 5 further characterized by
   said pivot means including pins in the walls of the recess and notches in the sides of the handle, said notches being V-shaped with the pins engaging the crotches of the notches when the axis remains fixed with respect to the handle and moving along one side of the notch as the handle moves translationally with respect to the axis.

* * * * *